United States Patent Office 3,793,267
Patented Feb. 19, 1974

3,793,267
HETEROCYCLIZED POLYMER
William Bracke, Ransbeekstraat 120, Brussels, Belgium
No Drawing. Continuation of abandoned application Ser. No. 61,849, Aug. 6, 1970. This application June 26, 1972, Ser. No. 266,346
Int. Cl. C08f 9/00
U.S. Cl. 260—94.1
17 Claims

ABSTRACT OF THE DISCLOSURE

A new polymer composition prepared by the reaction of a polybutadynylene with a hydrazine, said polymer having the formula

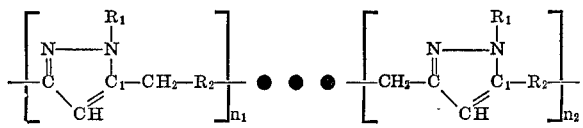

where $R_1$ is hydrogen or a monovalent hydrocarbonyl radical, $R_2$ is a divalent radical which is either an aliphatic, alicyclic, aliphatic-alicyclic radical or a carbocyclic or heterocyclic aryl radical or a substituted such radical, and wherein $n_1$ and $n_2$ are 0 or an integer with the sum of $n_1$ and $n_2$ being at least 5. The process by which such new polymer is prepared is also included.

---

This is a continuation of application Ser. No. 61,849, filed Aug. 6, 1970.

BACKGROUND OF THE INVENTION

The present invention is a continuation of co-pending application 61,849 filed Aug. 6, 1970, now abandoned, and relates to new heat resistant polymers. More particularly, the present invention relates to new heat resistant heterocyclized polybutadynylene polymers having a high mechanical strength and to a process for the production of such polymers.

Much effort has been devoted to the development of high-temperature, heat-resistant polymers. Several products have been developed which display considerably improved properties with respect to heat resistance and stability. However, most of these are not satisfactory for practical use, the main obstacles being either their poor processibility or their brittleness or the difficulties encountered to obtain the polymer in form sufficiently pure to have practical use. Also, there still remains room for much improvement in the heat resistance and stability properties of polymers.

It is an object of the present invention to provide new and improved heat-resistant polymers. Another object of the present invention is to provide new polymers highly resistant to heat for long periods of time and which have a high mechanical strength and are easily worked. Still another object of the present invention is to provide new heterocyclized polybutadynylene polymers of high heat resistance and stability. Another object of the present invention is to provide a process for producing a new and improved heat-resistant heterocyclized polybutadynylene polymer by which such polymers are obtained with substantially quantitative yields and are easily separated from the reaction mixture. Additional objects will become apparent from the following description of the invention herein disclosed.

SUMMARY OF THE INVENTION

The above objects, and others which will appear hereinafter, are reached with the new polymers of the present invention which have the general formula

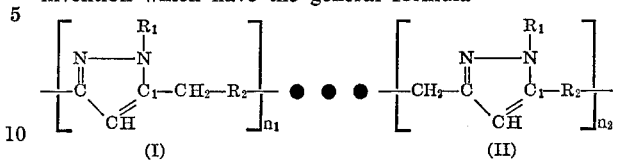

wherein $R_1$ is hydrogen or a monovalent hydrocarbonyl radical, $R_2$ is a divalent radical which is either an aliphatic, alicyclic, aliphatic-alicyclic radical or a carbocyclic or heterocyclic aryl radical or a substituted such radial, and wherein $n_1$ and $n_2$ are 0 or an integer with the sum of $n_1$ and $n_2$ being at least 5 and wherein $C_1$ of the pyrazole radical of (I) and (II) may be adjacent or opposite the methylene radical.

When $R_1$ of Formulas I and II above is a hydrocarbonyl radical, it may be acyclic, alicyclic or aryl. Generally, it will be of no greater than 6 carbon atoms and preferably, when a hydrocarbonyl radical, is an alkyl radical of 1 to 6 carbon atoms, preferably 1 to 3 carbon atoms in particularly preferred compositions of the present invention, $R_1$ is a methyl or hydrogen group.

In the most useful polymers of the present invention, $R_2$ is a heterocyclic or carbocyclic aryl radical. Preferably, $R_2$ is a carbocyclic radical, most often being a phenylene radical.

The polymers of the present invention can comprise the following units, distributed at random:

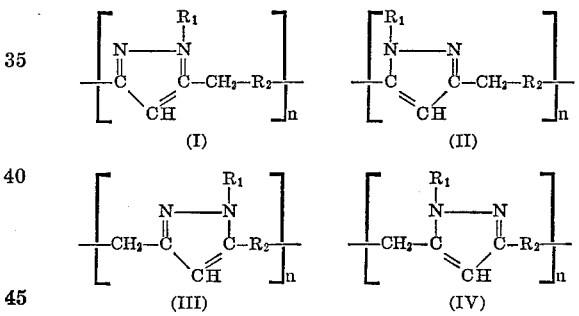

When $R_1$ is hydrogen, the Formulas I and II represent the tautomeric forms of the same species. The same is true for Formulas III and IV.

In accordance with the present invention, these new polymers are prepared by reacting a hydrazine with a polymeric diacetylene having the general formula

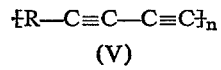

(V)

wherein R is a divalent radical which is either an aliphatic, alicyclic, aliphatic-alicyclic radical or a heterocyclic or carbocyclic aryl radical or a substituted such radical, and $n$ is an integer of at least 5. The substituted radicals may have alkyl, naphthyl, or aryl hydrocarbon groups or halogens, amino, nitro, hydroxyl and like groups as substituents. Preferably R is a phenylene or naphthylene radical or a substituted such radical. The particularly preferred polymeric diacetylene reactants are those of Formula V above wherein R is a phenylene or naphthylene radical with phenylene being the most useful.

The hydrazine reactant generally is one of the formula NH$_2$—NHR wherein R is hydrogen or a hydrocarbonyl radical. Generally, when a hydrocarbonyl radical, this R is acyclic, alicyclic or aryl. Usually, R will have no more than 6 carbon atoms. More often, as a hydrocarbonyl radical, R is an alkyl radical of 1 to 6 carbon atoms, preferably 1 to 3 carbon atoms. In preparing the particularly preferred polymers of the present invention, this R is hydrogen or a methyl group.

The preferred polymers of the present invention, as well as the preferred starting polymer reactants, which contain a phenylene radical in each repeating unit, may have the linking unit linked in either the para or meta position to the phenylene radical.

The reaction temperature for forming the polymers of the present invention may vary within wide limits from ambient and below to 250° C. and higher. The particular temperature depends upon the nature of the R substituent of the above described hydrazines. When R is hydrogen, temperatures higher than 50° C. are preferred and conveniently the condensation is carried out at the reflux temperature of the hydrazinic compound (i.e. 113.5° C. for hydrazine). When temperatures higher than the boiling point of the reaction mixture are employed, a pressure vessel is used.

At least the minimum amount of 1 mole of hydrazinic compound required to react with each unit of the starting polymeric diacetylene should be used; in general, however, an excess of this hydrazinic compound is advisable, not only to assure an optimum yield, but also to act as a diluent for the reaction mixture. The extent of this excess may be varied within wide limits, depending i.e. on the viscosity of the starting polymer, the reaction temperature and the eventual use of a solvent. In fact, for reasons of solubility and according to the molecular weight of the polymeric diacetylene, solvents such as dimethylformamide, dimethylsulfoxide, pyridine, phenylhydrazine, a-picoline, are advantageously added to the reaction mixture; these solvents avoid the precipitation of the resulting polymer before completion of the reaction.

The polymer of the present invention, containing pyrazole groups in its repeating units, is easily separated from the reaction mixture by adding a non-solvent for the polymer, i.e., methanol. The precipitated polymer is then filtered, washed with methanol and dried, giving a white fibrous material.

These polymers, are soluble in dimethylformamide, dimethylsulfoxide, N-methylpyrrolidone, trifluoroacetic acid, hexamethylphosphoramide (HMPA), sulfolane and similar solvents.

Solvent solutions containing the polymer of the present invention with an inherent viscosity of about 0.7 dl./gram (0.5 g. of polymer in 100 ml. of dimethylformamide at 30° C.) are easily obtained in accordance with the present invention. From these solutions, tough colorless films with a high tensile strength can be cast. Using conventional techniques (wet spinning) strong fibers can be spun. The materials are stable at temperatures higher than 300° C. To further describe and specifically illustrate the present invention, the following examples are presented.

Example 1

A series of 5 polymers were prepared as follows: A 25 ml. flask, equipped with a reflux condenser and a magnetic stirrer, was charged with 0.5 g. of poly (phenylene butadynylene), 5 ml. of hydrazine prepared from hydrazine hydrate by dehydration over solid sodium hydroxide, and 5 ml. of a solvent. The reaction mixture was heated at reflux temperature during 1 hour. The resulting polymer was poured into methanol and a white fibrous material precipitated. This precipitate was filtered, washed with methanol and vacuum dried at 80° C. The following table summarizes the properties of the starting polymeric diacetylene, the reaction temperature, solvent and the yield and viscosity of the final polymer.

| | 1 | 2 | 3 | 4 | 5 |
|---|---|---|---|---|---|
| Starting polymer: p-isomer, percent | 20 | 10 | 10 | 10 | 0 |
| Viscosity of starting polymer [1] | 0.56 | 1.33 | 1.33 | 1.33 | 0.41 |
| Reaction: | | | | | |
| Solvent | (2) | (2) | (3) | (4) | (3) |
| Temperature (° C.) | 110 | 125 | 115 | 125 | 115 |
| Percent yield | 96.6 | 98.5 | 93.5 | 90.5 | 90 |
| Viscosity of the final polymer [5] | 0.51 | 0.73 | 0.69 | 0.75 | 0.25 |

[1] Inherent viscosity of a solution of 0.5 g. of polymer in 1 dl. of H M P A, at 140° C.
[2] Phenylhydrazine.
[3] Pyridine.
[4] a-Picoline.
[5] Inherent viscosity of a solution of 0.5 g. of polymer in 1 dl. of dimethylformamide at 30° C.

The polymers obtained, containing pyrazole units in the repeating units, were heated up to 320° C. and no melting or decomposition was apparent.

A film prepared by casting a solution of final polymer No. 3 of the above table, in pyridine, and vacuum dried at 150° C. showed a very high tensile strength (higher than 20,000 p.s.i.).

Example 2

To a 25 ml. flask as described in Example I are added 0.5 gram of a poly(phenylene butadynylene) of a 90–10 meta-para ratio, 5 ml. of methylhydrazine and 5 ml. of pyridine. Nitrogen is slowly introduced and the mixture heated up to 100° C. The starting polymer slowly dissolves and after one hour, the mixture is cooled and the final polymer precipitated from the reaction mixture with methanol. These final fibrous polymers are filtered from the reaction mixture and dried in vacuo at 80° C.

This final polymer is found to have substantially similar properties of tensile strength and temperature resistance as was found for polymer No. 3 of Example 1.

What is claimed is:

1. A heat resistant polymer composition wherein the polymer has the formula

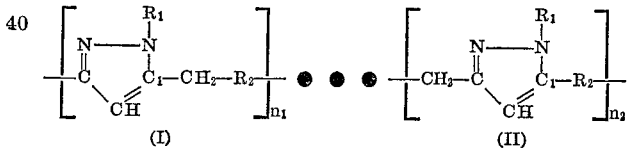

wherein $R_1$ is selected from the group consisting of hydrogen and monovalent hydrocarbonyl radicals and $R_2$ is a divalent radical selected from the group consisting of aliphatic, alicyclic, aliphatic-alicyclic and heterocyclic and carbocyclic aryl radicals and substituted such radicals and and wherein $n_1$ and $n_2$ are 0 or an integer with the sum of $n_1$ and $n_2$ being no less than 5 and wherein $C_1$ may be adjacent or opposite the methylene radical.

2. The heat resistant polymer composition of claim 1 wherein $R_2$ is a divalent aliphatic hydrocarbon radical.

3. The heat resistant polymer composition of claim 1 wherein $n_1$ and $n_2$ are integers.

4. The heat resistant polymer composition of claim 1 wherein $R_2$ is a divalent carbocyclic aryl radical.

5. The heat resistant polymer composition of claim 4 wherein said divalent carbocyclic radical is a phenylene radical.

6. The heat resistant polymer composition of claim 4 wherein said divalent carbocyclic radical is a naphthylene radical.

7. The heat resistant polymer composition of claim 1 wherein $R_2$ is a divalent heterocyclic radical.

8. The heat resistant polymer composition of claim 7 wherein said divalent heterocyclic radical is a pyridinediyl radical.

9. The heat resistant polymer composition of claim 1 wherein $R_2$ is a substituted divalent radical selected from the group consisting of substituted carbocyclic radicals and substituted heterocyclic radicals.

10. The heat resistant polymer composition of claim 9 wherein the substituents to said substituted divalent radical are selected from the group consisting of alkyl, naphthyl and aryl hydrocarbon radicals and halogen, amino, nitro and hydroxy radicals.

11. The heat resistant polymer composition of claim 5 wherein the repeating units of said polymer are randomly linked through the meta- and para-positions of said phenylene radical.

12. The heat resistant polymer composition of claim 1 having a molecular weight of above 1000.

13. The heat resistant polymer composition of claim 1 having a molecular weight of from 1000 to 50,000.

14. The heat resistant polymer composition of claim 1 wherein $R_1$ is an acyclic radical of no greater than 6 carbon atoms.

15. The heat resistant polymer composition of claim 1 wherein $R_1$ is selected from the group consisting of hydrogen and methylene radical.

16. The heat resistant polymer composition of claim 1 having the formula

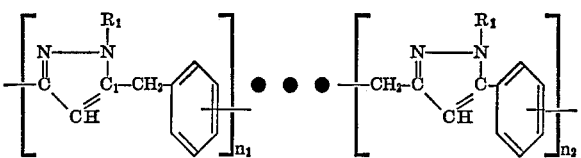

wherein the repeating units may be attached to the phenylene radical in either the meta or para position and wherein either $n_1$ and $n_2$ may be 0 or an integer but the sum of $n_1$ and $n_2$ is no less than 5.

17. The method of forming a heat resistant polymer having the formula

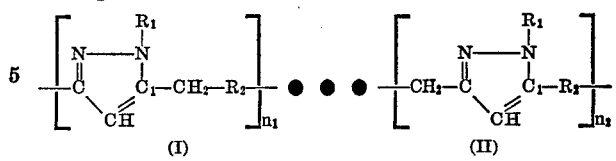

wherein $R_1$ is selected from the group consisting of hydrogen and monovalent hydrocarbonyl radicals and $R_2$ is a divalent radical selected from the group consisting of aliphatic, alicyclic, aliphatic-alicyclic and heterocyclic and carbocyclic aryl radicals and substituted such radicals and wherein $n_1$ and $n_2$ are 0 or an integer with the sum of $n_1$ and $n_2$ being no less than 5 and wherein $C_1$ may be adjacent or opposite the methylene radical comprising reacting a polybutadiynylene compound having the formula

in which $R_2$ is as identified above with a hydrazine of the formula $R_1$—NH—$NH_2$ in which $R_1$ is as defined above.

References Cited
UNITED STATES PATENTS

| | | | |
|---|---|---|---|
| 3,213,068 | 10/1965 | Frazza | 260—79.3 |
| 3,300,456 | 1/1967 | Hay | 260—88.2 |
| 3,519,611 | 7/1970 | Hay | 260—94.1 |
| 3,332,916 | 7/1967 | Hay | 260—80 |

JOSEPH L. SCHOFER, Primary Examiner

W. F. HAMROCK, Assistant Examiner

U.S. Cl. X.R.

260—93.5 A